United States Patent
Paduano et al.

(10) Patent No.: US 9,557,742 B2
(45) Date of Patent: Jan. 31, 2017

(54) AUTONOMOUS CARGO DELIVERY SYSTEM

(71) Applicant: Aurora Flight Sciences Corporation, Manassas, VA (US)

(72) Inventors: James D. Paduano, Boston, MA (US); John B. Wissler, Waltham, MA (US); Michael D. Piedmonte, Stow, MA (US); David A. Mindell, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 14/554,852

(22) Filed: Nov. 26, 2014

(65) Prior Publication Data

US 2015/0323932 A1 Nov. 12, 2015

Related U.S. Application Data

(60) Provisional application No. 61/909,471, filed on Nov. 27, 2013.

(51) Int. Cl.
| | |
|---|---|
| *G05D 3/00* | (2006.01) |
| *G05D 1/10* | (2006.01) |
| *G05D 1/02* | (2006.01) |
| *G05D 1/04* | (2006.01) |

(52) U.S. Cl.
CPC ............ *G05D 1/102* (2013.01); *G05D 1/0202* (2013.01); *G05D 1/042* (2013.01)

(58) Field of Classification Search
CPC .............................. G05D 1/0202; G05D 1/042
USPC ........................................................... 701/3
See application file for complete search history.

(56) References Cited

U.S. PATENT DOCUMENTS

| | | | |
|---|---|---|---|
| 6,948,681 B2 | 9/2005 | Stupakis | |
| 8,260,736 B1 | 9/2012 | Lear et al. | |
| 8,265,818 B2 | 9/2012 | Allport | |
| 8,437,890 B2 | 5/2013 | Anderson et al. | |
| 2009/0050750 A1* | 2/2009 | Goossen | B64C 39/024 244/76 R |
| 2009/0055038 A1* | 2/2009 | Garrec | G01S 11/10 701/17 |
| 2010/0152933 A1* | 6/2010 | Smoot | G01C 21/165 701/16 |
| 2011/0017863 A1* | 1/2011 | Goossen | F41G 7/303 244/3.14 |
| 2011/0068224 A1* | 3/2011 | Kang | B64C 39/024 244/116 |
| 2011/0139928 A1* | 6/2011 | Morris | B64C 27/02 244/1 TD |
| 2011/0174931 A1* | 7/2011 | Berland | B64D 17/025 244/152 |
| 2012/0091259 A1* | 4/2012 | Morris | B64C 27/02 244/17.13 |

(Continued)

OTHER PUBLICATIONS

M. Whalley et al, "The NASA/Army Autonomous Rotorcraft Project", American Helicopter Society 59th Annual Forum, May 6-8, 2003.

*Primary Examiner* — Ian Jen

(74) *Attorney, Agent, or Firm* — Michael Stanley Tomsa; McAndrews, Held & Malloy, Ltd.

(57) ABSTRACT

The present invention is directed to a system and methods of providing platform-agnostic systems and methods capable of providing an integrated processor and sensor suite with supervisory control software and interfaces to perform small unit rapid response resupply and CASEVAC into hazardous and unpredictable environments.

23 Claims, 8 Drawing Sheets

(56) References Cited

U.S. PATENT DOCUMENTS

| | | | |
|---|---|---|---|
| 2013/0008998 A1* | 1/2013 | Morris | B64C 27/02 244/3 |
| 2013/0054054 A1* | 2/2013 | Tollenaere | G05D 1/0858 701/3 |
| 2013/0200207 A1* | 8/2013 | Pongratz | B64C 37/02 244/2 |
| 2014/0124621 A1* | 5/2014 | Godzdanker | B64F 1/125 244/110 E |
| 2014/0316616 A1* | 10/2014 | Kugelmass | G05D 1/101 701/8 |

* cited by examiner

AUTONOMOUS CARGO DELIVERY SYSTEM

CROSS REFERENCE TO RELATED APPLICATIONS

This application claims priority to U.S. Provisional Patent Application No. 61/909,471, filed on Nov. 27, 2013, which is hereby incorporated by reference.

STATEMENT OF GOVERNMENT INTEREST

This invention was made with government support under Contract Number: N00014-12-C-0671 awarded by United States Navy. The government has certain rights in the invention.

FIELD OF THE INVENTION

The present invention is directed to systems and methods for enabling unmanned and optionally-manned cargo delivery to widely separated small units in demanding and unpredictable conditions.

BACKGROUND OF THE INVENTION

Recent expeditionary operations in Afghanistan and Iraq uncovered a need for resupply and casualty evacuation (CASEVAC) of small units in the field under hazardous conditions and with minimal infrastructure. These conditions are common to a variety of mission sets, such as humanitarian relief operations, noncombatant evacuations, routine cargo resupply, underway replenishment, irregular warfare, and sustained conventional combat. In order to support robust rapid resupply and CASEVAC operations in dynamic threat environments, where the warfighter has the most urgent need for these services, a number of new and innovative capabilities have been developed.

For example, U.S. Pat. No. 8,260,736 discloses an intelligent system manager system and method for managing and controlling a platform comprising a management component providing intelligent decision support and managing platform functions responsive to data representative of the platform and equipment thereof; an execution and monitor component for causing execution of commands controlling the platform and equipment thereof, and monitoring the execution of the commands and the status of platform sensors and platform equipment; a display component providing information representative of the current state of the platform and receiving input; and a common services component providing processing services to the management component, to the execution and monitor component, and to the display component.

U.S. Pat. No. 8,265,818 discloses a command and control system including a core unit, with a processor and a map display engine. The core unit is configured to exchange information with a multi-domain heterogeneous unmanned vehicle command and control module, a multi-sensor command and control module, and an asset-tracking module. The asset-tracking module estimates the location of an indeterminate object. A control unit exchanges information with an input device. A detecting unit detects modules that are associated with the core unit. A subscription unit logs parameters associated with the detected modules and determines types of data to send to the detected units based on the parameters. A script unit receives and implements command and control scripts for the detected modules. A display output provides display information of a combined representation of information from the detected modules and map information, including locations of the vehicles and sensors under control and the estimated location of the indeterminate object.

U.S. Pat. No. 6,948,681 discloses a modular automated air transport system comprising an unmanned autonomous vehicle having a selectively detachable control systems portion and a structural air frame portion, wherein the structural air frame portion contains an interior cargo hold, aerodynamic members having control surfaces and at least one propulsion device attached to the structural air frame portion; and wherein the control system portion includes a control computer for autonomously controlling the flight of said air transport system from one known location to a second known location.

U.S. Pat. No. 8,437,890 discloses various types and levels of operator assistance performed within a unified, configurable framework. A model of the device with a model of the environment and the current state of the device and the environment may be used to iteratively generate a sequence of optimal device control inputs that, when applied to a model of the device, generates an optimal device trajectory through a constraint-bounded corridor or region within the stated space. This optimal trajectory and the sequence of device control inputs that generates it are used to generate a threat assessment metric. An appropriate type and level of operator assistance is generated based on this threat assessment. Operator assistance modes include warnings, decision support, operator feedback, vehicle stability control, and autonomous or semi-autonomous hazard avoidance. The responses generated by each assistance mode are mutually consistent because they are generated using the same optimal trajectory.

The article entitled "The NASA/Army Autonomous Rotorcraft Project" to M. Whalley provides an overview of the NASA Ames Research Center Autonomous Rotorcraft Project (ARP). Similarly, the article entitled "What Is an Open Architecture Robot Controller?" to Ford addresses the issue of what an open architecture robot controller is.

Despite the foregoing, a need exists for a platform-agnostic solution for an aerial vehicle (e.g., a Vertical Take Off and Landing (VTOL) aerial vehicle) capable of providing an integrated processor and sensor suite with supervisory control interfaces to perform small unit rapid response resupply and CASEVAC into hazardous and unpredictable environments.

BRIEF SUMMARY OF THE INVENTION

The present invention provides platform-agnostic systems and methods capable of providing an integrated processor and sensor suite with supervisory control interfaces to perform small unit rapid response resupply and CASEVAC into hazardous and unpredictable environments. More specifically, the present invention provides an Autonomous Aerial Cargo/Utility (AACU) system.

According to a first aspect, an autonomous aerial system comprises: an aerial vehicle configured to communicate with an operating base, wherein said aerial vehicle is configured to receive mission plan data from said operating base; and a supervisory control system operatively coupled with the aerial vehicle, wherein the supervisory control system is configured to generate flight control signals data based on data gathered by a sensor package, the sensor package configured to (1) detect obstacles, and (2) perceive physical features of an unprepared landing zone, wherein the supervisory control system is configured to communicate the flight control signal data to the aerial vehicle, and wherein said aerial vehicle is configured to autonomously navigate to, and touchdown at, the unprepared landing zone based at least in part on (1) said mission plan data, and (2) said flight control signal data.

According to a second aspect, a supervisory control system for controlling an aerial vehicle comprises: a sensor package configured to (1) detect obstacles, and (2) perceive physical features of an unprepared landing zone; and a processor operatively coupled with an aerial vehicle via a control interface, wherein said processor communicates mission plan data from an operating base to said aerial vehicle via the control interface, wherein the processor generates flight control signal data using data collected via the sensor package, wherein the processor is configured to communicate the flight control signal data to the aerial vehicle via the control interface, and wherein said processor enables said aerial vehicle to autonomously navigate to, and touchdown at, the unprepared landing zone based at least in part on (1) said mission plan data, and (2) said flight control signal data.

In certain aspects, said mission plan data may comprise one or more routes, and a designated touchdown zone within said unprepared landing zone.

In certain aspects, said mission plan data may further comprise a first contingency operation, and a second contingency operation.

In certain aspects, said one or more routes may comprise (1) a launch route, (2) an approach route, and (3) a flight route.

In certain aspects, said supervisory control system may be configured to determine, using said sensor package, whether the designated touchdown zone is feasible, based at least in part on a physical characteristic of the designated touchdown zone.

In certain aspects, said supervisory control system may be configured to identify one or more alternate touchdown zones within said unprepared landing zone if said supervisory control system does not determine that the designated touchdown zone is feasible.

In certain aspects, said one or more alternate touchdown zones are communicated to an operator at the operating base for approval.

In certain aspects, the sensor package includes (1) a radio altimeter, (2) electro optical and/or infrared imagers, and (3) a light detection and ranging device.

In certain aspects, the sensor package includes (1) a radio detection and ranging device and (2) a global positioning system device.

In certain aspects, the supervisory control system may be operatively coupled with the aerial vehicle via an interface conforming to Open Architecture standards.

In certain aspects, said mission plan data may comprise at least one route in accordance with North Atlantic Treaty Organization Standardization Agreement 4586.

In certain aspects, said aerial vehicle may be a vertical take-off and landing aerial vehicle.

In certain aspects, the supervisory control system may utilize a modular open architecture sensor suite that is physically mounted on the aerial vehicle.

In certain aspects, said first contingency operation may be a lost communications contingency.

In certain aspects, said second contingency operation may be an alternate touchdown zone within said unprepared landing zone.

BRIEF DESCRIPTION OF THE FIGURES

These and other advantages of the present invention will be readily understood with reference to the following specifications and attached drawings, wherein.

DETAILED DESCRIPTION OF THE INVENTION

Figure 1:
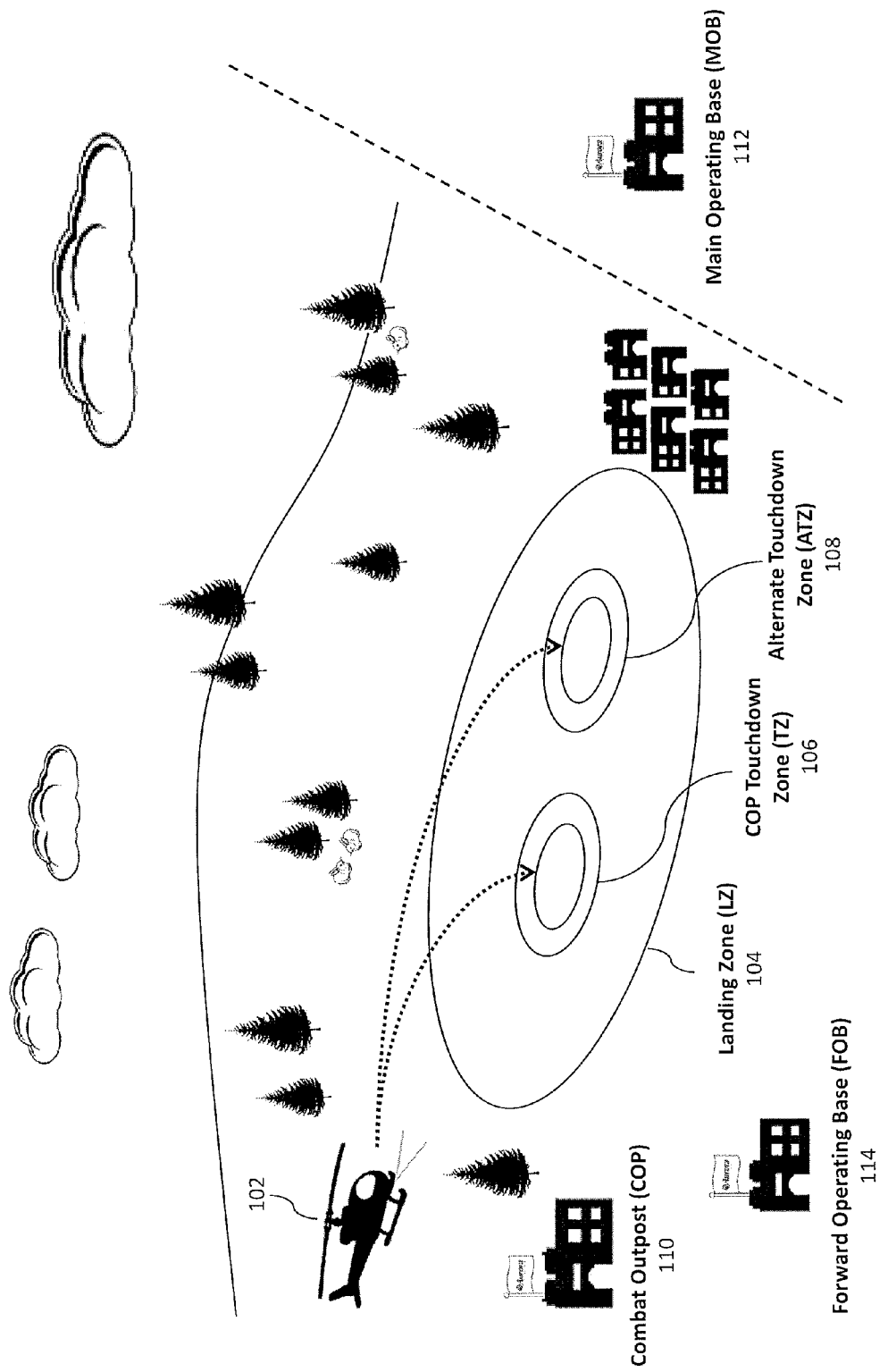
FIG. 1 illustrates an example aerial vehicle equipped with an Autonomous Aerial Cargo/Utility (AACU) system on approach to a landing zone.

Embodiments of the present invention will be described hereinbelow with reference to the accompanying drawings. In the following description, well-known functions or constructions are not described in detail because they would obscure the invention in unnecessary detail. The below-described Autonomous Aerial Cargo/Utility (AACU) System provides a modular open architecture including supervisory control software and interfaces and sensors that can be rapidly and cost-effectively integrated and physically mounted on a number of different aerial vehicle platforms, including Vertical Take Off and Landing (VTOL) platforms. For this application, the following terms and definitions may apply:

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

As used herein, the term "aerial vehicle" refers to a machine capable of flight, including, but not limited to, VTOL aircraft. VTOL aircraft may include both fixed-wing aircraft (e.g., Harrier jets), rotorcraft (e.g., helicopters), and/or tilt-rotor/tilt-wing aircraft (e.g., the Osprey aircraft).

As used herein, the words "exemplary" and "example" mean "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments," or "invention" do not require that all embodiments of the invention include the discussed feature, advantage or mode of operation.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

An unmanned, and potentially optionally-manned, aerial vehicle equipped with an AACU system provides rapid response cargo delivery to widely separated small units in demanding and unpredictable conditions that pose unacceptable risks to both ground resupply personnel and aircrew. The wide applicability of the AACU system for autonomous cargo capability across different vehicle platforms facilitates sufficient reliability to be entrusted with not just precision cargo delivery, but also, in the long term, with evacuating human casualties from remote sites. As will be discussed, the AACU system may be implemented via a computational resource and sensor suite mounted on vehicle platforms, together with software that facilitates the planning, sensing and avoidance functions.

An objective of the present invention is to provide a modular open architecture software and sensor suite including supervisory control interfaces that can be rapidly and cost-effectively integrated and physically mounted on a number of different aerial vehicle platforms. Due to concerns that proprietary systems hinder or prevent cost-effective upgrades and modifications, am Open Architecture, such as a Global Open Architecture Layer (GOAL), may be provided to allow portability (e.g., the software that allows a new or legacy platform the ability to "plug in" to the software and sensor suite will be open source). Thus, an AACU system's software, sensor package (e.g., a sensor payload/sensor suite, which may further include a processor, and/or other supporting hardware), and supervisory control interfaces may be portable across different vehicles such that both legacy and new platforms can enjoy the benefits of the AACU system. The concept of modularity can also apply to components within systems or vehicles to enhance cross-system compatibility while simplifying field level maintenance and repair.

Another objective of the AACU system is threat and/or obstacle detection and avoidance, autonomous landing site selection, and descent-to-land capabilities that incorporate autonomous mission planning technologies in an open architecture framework that interfaces seamlessly with the aerial vehicle and Unmanned Aerial System (UAS) network and control infrastructures.

The AACU system, which functions as a form of supervisory control system, generally comprises, for example: (1) a sensor package to accomplish detection of obstacles and perception of physical features and their properties; (2) a mission management layer that enables optional human supervisory control through advanced autonomy; (3) route and trajectory planner for generating vehicle path commands; and (4) a mission-centered global open architecture layer. The AACU system may further comprise human-system interfaces for a combat outpost (COP), a remote main operating base (MOB), and/or a forward operating base (FOB). As will be evidenced below, an aspect of the present disclosure focuses on the second element, an autonomous mission planning technology in an open architecture framework that interfaces seamlessly with the aerial vehicle, UAS network, and/or control infrastructures. More particularly, within the context of a mission-centered global open architecture layer.

The AACU system's sensor package and supervisory control system may be integrated and/or physically mounted on a number of different vehicle and aerial vehicle platforms, including VTOL platforms. While the aerial vehicle 102 depicted in the Figures is a VTOL aerial vehicle, it will be understood that the autonomous vehicles described herein may include any vehicle, device, component, element, etc., that may be usefully navigated using the principles of the system disclosed herein, including, without limitation, any unmanned vehicle, manned vehicle, aerial vehicle, ground vehicle, aquatic vehicle, space vehicle, remote-controlled vehicle, large vehicle, small vehicle, etc., unless explicitly stated otherwise or made clear from the text. For example, the autonomous vehicles described herein may include helicopters or other vehicles using horizontal propellers for lift. The autonomous vehicles described herein may also, or instead, include vehicles with forward flight capability, such as fixed-wing aerial vehicles.

As noted above, employing an Open Architecture and/or GOAL further allows portability of the AACU system capability to other platforms. Alternatively, the AACU system's sensor package and supervisory control system may be integrated with the aerial vehicle platform during aerial vehicle fabrication.

While numerous aerial vehicle platforms are possible, an example general aerial vehicle type suitable for use with the AACU system may operate at low density, high altitudes (greater than 12,000 ft density altitude), delivering multiple in-stride cargo drops, over round-trip distances with, for example, between 150 and 365 nautical miles, thereby reducing the number of ground transport delivered items. The aerial vehicle may be further configured to carry 1,600 to 5,000 pounds of payload internally (with, for example, some internal capacity being allocated for CASEVAC). The aerial vehicle may travel at, for example, speeds of between 110 and 250 knots. Within the terminal area of 5 nautical miles, the aerial vehicle may be configured to descend and land within a two to four minute window/timeframe and execute an autonomous landing as close to the requested site as possible (e.g, an objective of less than 1 meter error from a computer-designated landing site center point) without over-flight of the landing zone (e.g., the vehicle executes a straight-in approach without a first pass). In addition, the aerial vehicle may be able to operate at night (thus facilitating operation 24 hours a day, 7 days a week) in possibly satellite-denied settings (e.g., preventing communication and/or satellite-based geo-location such as that provided by the Global-Positioning System, denoted 'GPS-denied'), and in all types of environments, including steep and rugged terrain, instrument meteorological conditions (IMC) and non-icing conditions, high and hot environments, and in dust and sand conditions with minimum visibility. An aerial vehicle equipped with an AACU system may be configured to operate in weather conditions that exceed those of maimed flight capabilities. While the forgoing describes the performance traits of an example aerial vehicle, one of skill in the art would recognize that the AACU system's sensor package and supervisory control system may be integrated and physically mounted on a number of different aerial vehicle platforms as desired for a particular need.

As illustrated in FIG. 1, an aerial vehicle 102 equipped with an AACU system (e.g., via an AACU system-enabled platform) autonomously detects and executes an aerial vehicle landing to an unprepared landing zone (LZ) 104 while simultaneously negotiating and navigating threats and obstacles (e.g., vegetation, terrain, buildings, etc.), potentially requiring evasive maneuvering. The landing zone (LZ) 104 may have a radius of, for example, 50-150 meters. Within said landing zone (LZ) 104 are one or more touchdown zones, including, for example, a touchdown zone (TZ) designated by the field operator using the COP interface 106 and one or more alternate touchdown zones (ATZ) 108. Each touchdown zone may have a radius of, for example, 1 to 50 meters, more preferably 5 to 25 meters, and most preferably about 10-20 meters. In operation, the AACU system evaluates the area surrounding the COP-designated touchdown zone (TZ) 106 designated by the operator at combat outpost (COP) 110 through a AACUS human-systems interface. If the COP-designated touchdown zone (TZ) 106 is deemed unsuitable for touchdown, an alternate touchdown zone (ATZ) 108 may be identified. One or more alternate touchdown zones (ATZ) 108 may be identified by the AACU system or an operator, who may be based at the combat outpost (COP) 110, a remote main operating base (MOB) 112, or a forward operating base (FOB) 114.

The AACU system may be configured to avoid obstacles (both static and dynamic) in flight, as well as in the descent-to-land phase, in a potentially satellite-denied environment. Further, a consideration of the AACU system is the approach, descent, and landing phase, so the intent for obstacle avoidance is to consider navigation in low-level flight envelopes. Such obstacles could be static (e.g., towers, trees, building, etc.) or dynamic, (e.g., no fly zones due to enemy activity, other vehicles, etc.). Similarly, the AACU system may be further configured to detect and negotiate any conditions that could prevent a safe approach and/or landing (e.g., unsafe/unstable ground composition, marshy/muddy ground, vegetation, and/or water) and able to negotiate sloped landing sites. Moreover, the AACU system may be further capable of generating complete paths from launch to landing (or touchdown), which, in certain aspects, may be modifiable by a human in a supervisory control role in real time, and to generate and execute new paths as dictated by mission plan data contingencies.

Accordingly, in some aspects, an aerial vehicle 102 equipped with an AACU system may be capable of GOAL-based supervisory control with an unobtrusive device from a variety of operators with no specialized training as well as from various locations (e.g., field personnel, medical personnel, supply personnel, command center personnel), which could be beyond-line-of-sight (BLOS) from the launch location. The AACU system is also advantageous in that it allows an operator with no special skills to supervise and request services from the system. The AACU system may be configured to operate in environments that currently present significant risks to manned aerial vehicles (e.g, weather, threat, terrain, etc.), and, ideally, to operate in environments that manned aerial vehicles cannot (e.g., high wind, steep terrain, low visibility, etc.). The AACU system may be configured to be monitored and supervised through a ground control station with mission planning capabilities from a remote operations center. Thus, as will be discussed below, an easy to use human-system interface (HSI) device may be employed.

The AACU system may be configured to operate in meteorological or operating conditions that may limit traditional manned cargo delivery, especially in austere terrains with low visibility due to dust, precipitation, and fog. Three interfaces for interaction with the AACU system include, for example: (1) operations center ground control stations; (2) field operators; and/or (3) vehicle-mounted systems for ground communication.

Figure 2:
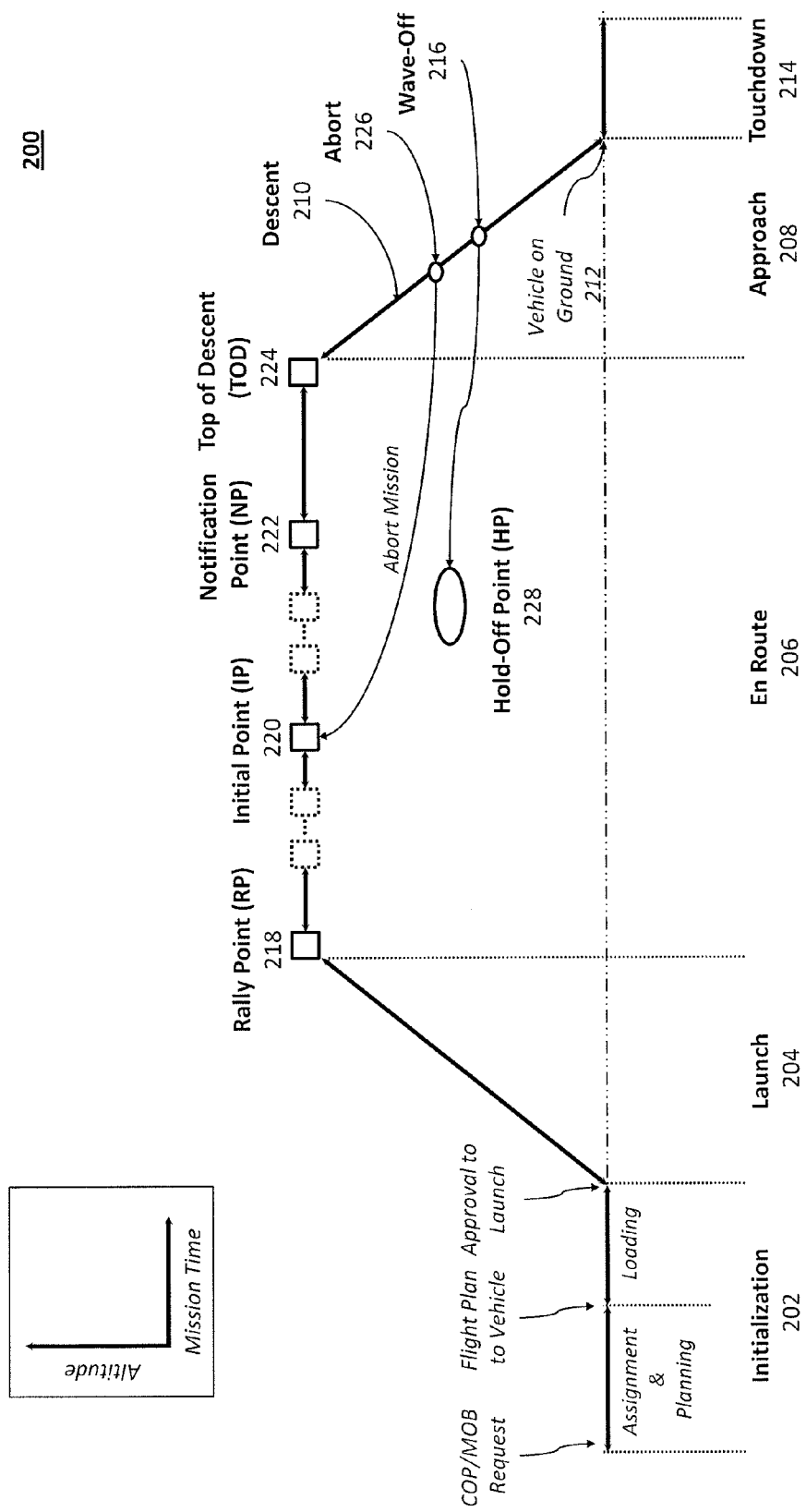
FIG. 2 illustrates a time-based diagram of various example mission phases for the aerial vehicle of FIG. 1.

FIG. 2 illustrates a time-based diagram of the various mission phases 200. Specifically, the mission generally comprises five phases, including initialization and configuration 202, launch 204, en route 206, approach 208, and touchdown 214. Each of these phases will now be described in greater detail below.

Initialization and Configuration 202.

Upon power-up, the AACU software initializes the hardware, runs a built-in test, and reports the results. Once initialized, the AACU software may wait for a mission (e.g., in the form of mission data) to be uploaded, or otherwise received, to the aerial vehicle 102, which is equipped with an AACU system. For example, the main operating base 112 may transmit to the aerial vehicle 102 mission data that may comprise a set of routes, per NATO Standardization Agreement 4586 (STANAG-4586), including, for example: (1) launch route; (2) approach route; (3) flight route; (4) contingency A; and (5) contingency B. After the mission data has been uploaded to the mission manager, the mission manager may send the mission data to the route and/or trajectory planner. STANAG-4586 is a North Atlantic Treaty Organization (NATO) Standard Interface of the Unmanned Control System (UCS) UAV interoperability. The standard includes data link, command and control, and human/computer interfaces.

Launch 204.

As noted above, the aerial vehicle 102 may be equipped with an autonomous normal flight mode, and a piloted flight mode. During autonomous normal flight mode, the aerial vehicle 102 may be commanded by the main operating base 112 to launch and follow a predefined launch route in accordance with, for example, the mission data previously received by the aerial vehicle 102. Thus, according to one aspect, the following sequence of events may occur to navigate the aerial vehicle 102 to the rally waypoint 218: (1) the aerial vehicle internal switch may be set to autonomous (whether a physical switch, or remote command); (2) the main operating base 112 sends a launch command to the vehicle management system (VMS); (3) the VMS commands the flight control system (e.g., a system having a flight controller operatively coupled with one or more flight components, and one or more sensors) to execute a launch and forwards the command to the mission manager; (4) the mission manager transitions from ground to launch mode and waits for a launch complete message from the flight control system; (5) the trajectory planner sends trajectory commands to the flight control system to guide it to the rally waypoint 218; (6) the aerial vehicle arrives at the rally waypoint 218. Alternatively, during piloted flight mode, the aerial vehicle may be piloted (e.g., remotely) directly to the rally waypoint 218 or to the initial point 220, hence there may be no need for execution of the launch route and/or sequence. In certain aspects, the autonomous normal flight mode may be overridden by a pilot. For example, if the AACU system appears to be malfunctioning, or immediate action is needed, the pilot may remotely, and quickly, regain control of the aerial vehicle using mechanisms typically in place for optionally piloted and test aircraft.

To maintain identical software for both autonomous and piloted mode scenarios, the following sequence of events may be employed to navigate the aerial vehicle 102 to the initial point 220: (1) the aerial vehicle 102 internal switch may be set to manual; (2) the pilot completes takes off; (3) the mission sequencer detects that the aerial vehicle 102 has taken off without a launch command and automatically transitions to a "FlyLaunchRoute" mode; and (4) the pilot flies the aerial vehicle 102 to the rally waypoint 218, at which point the aerial vehicle 102 may resume autonomous normal flight mode.

En Route 206.

If the aerial vehicle 102 reaches the rally waypoint 218 autonomously, the aerial vehicle 102 may automatically transition to the flight route set forth in the mission data and begin autonomously executing that flight route. Thus, once in autonomous mode, the aerial vehicle 102 autonomously executes the flight route because it has determined that it has completed the launch route 204 since it has reached the rally waypoint 218. The aerial vehicle 102 can autonomously execute the flight route, request landing confirmation at the notification waypoint 222, and executes the steps as described below, and/or in FIG. 4.

If the aerial vehicle 102 has been manually piloted to the rally waypoint 218, the following events may occur in order to transition to autonomous flight. The main operating base 112 may first send a STANAG-4586 Flight Vehicle Command and Status Message #42, Vehicle Operating Mode Command to the VMS, thereby putting it in loiter mode, at which point the aerial vehicle 102 may execute the loiter pattern until further commanded. For example, the main operating base 112 may send a STANAG Vehicle Mode #42, commanding the aerial vehicle to waypoint mode, at which point the pilot need not interact with the AACU system. Alternatively, the aerial vehicle pilot may put the aerial vehicle in autonomous mode. In yet another alternative, the aerial vehicle 102 may be configured to automatically enter autonomous mode once it arrives at a predetermined location (e.g., rally waypoint 218). After the aerial vehicle 102 has landed during the touchdown 214, the pilot may then launch again and fly back to the initial point 220 and repeat the process.

Approach 208 and Touchdown 214.

Once landing confirmation has been received by the AACU system at the notification waypoint 222, the aerial vehicle 102 may execute a descent procedure 210, starting at the top of the descent point 224 through the vehicle on ground point 212. During the descent procedure 210, the aerial vehicle 102 relies on the AACU system to identify and land at a predetermined touchdown zone (or alternative touchdown zone), while determining if a wave-off command has been received by the AACU system.

Figure 3A:
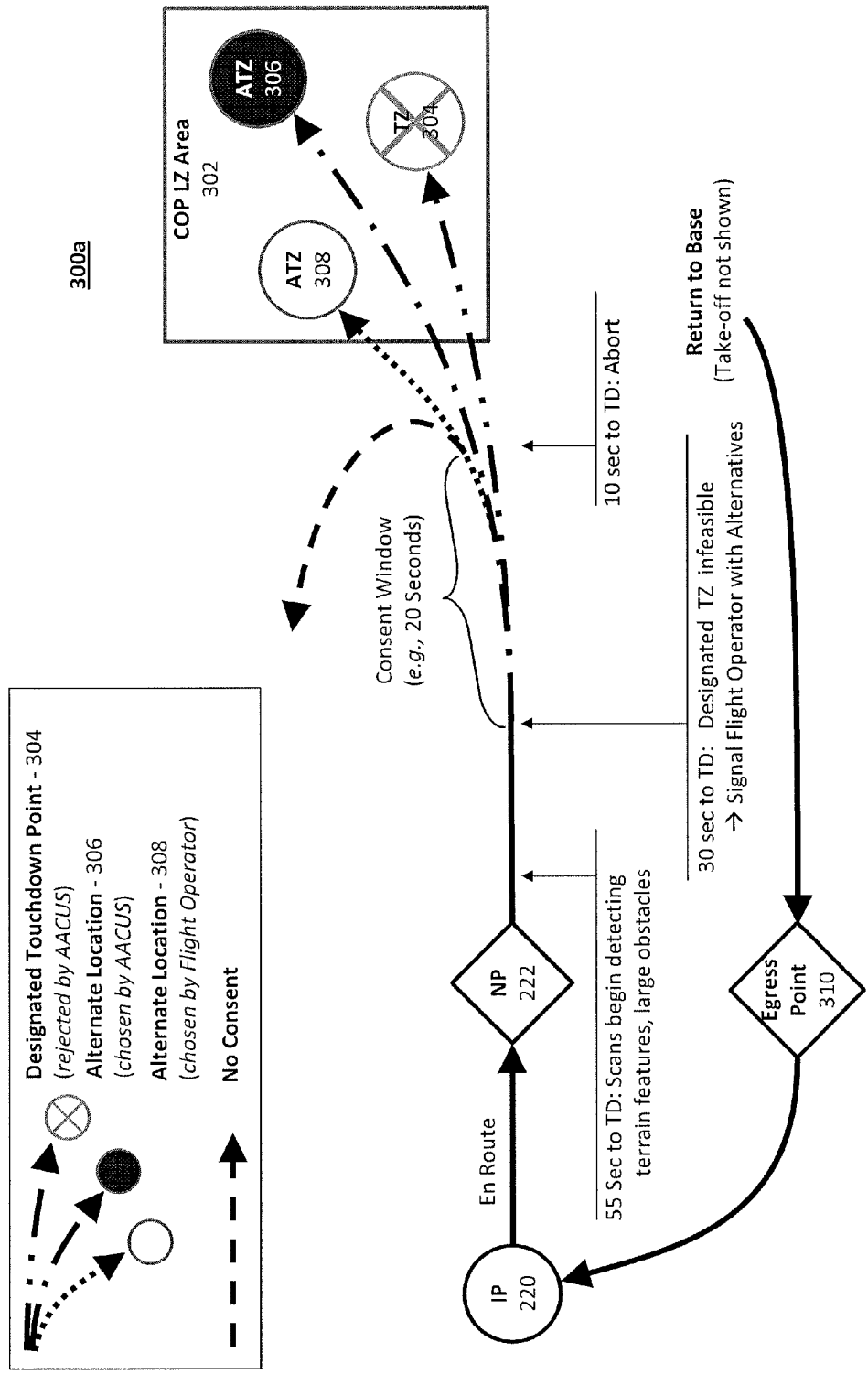
FIGS. 3a through 3c illustrate further detailed diagrams of example mission phases for the aerial vehicle of FIG. 1.
Figure 3B:
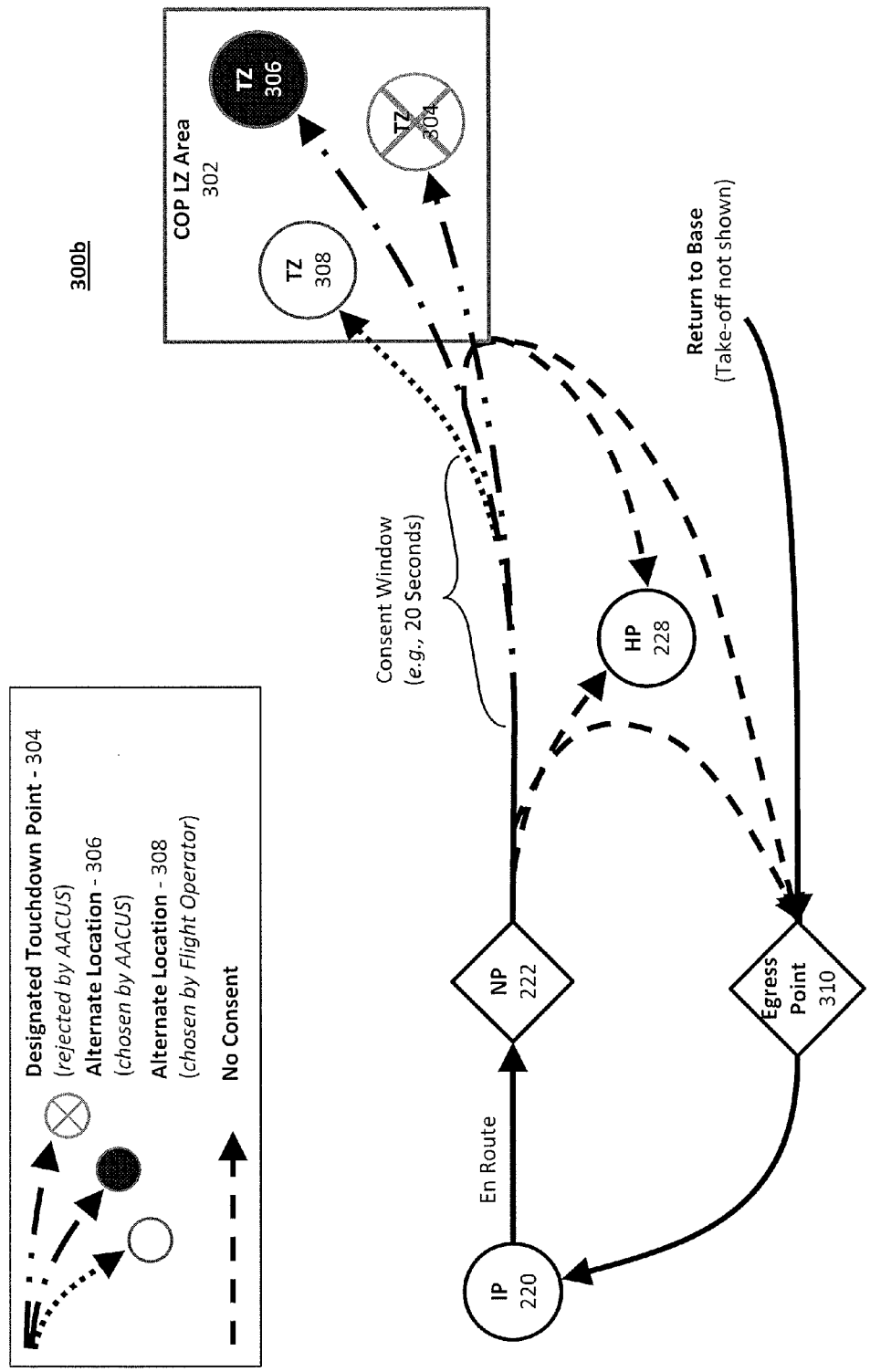
Figure 3C:
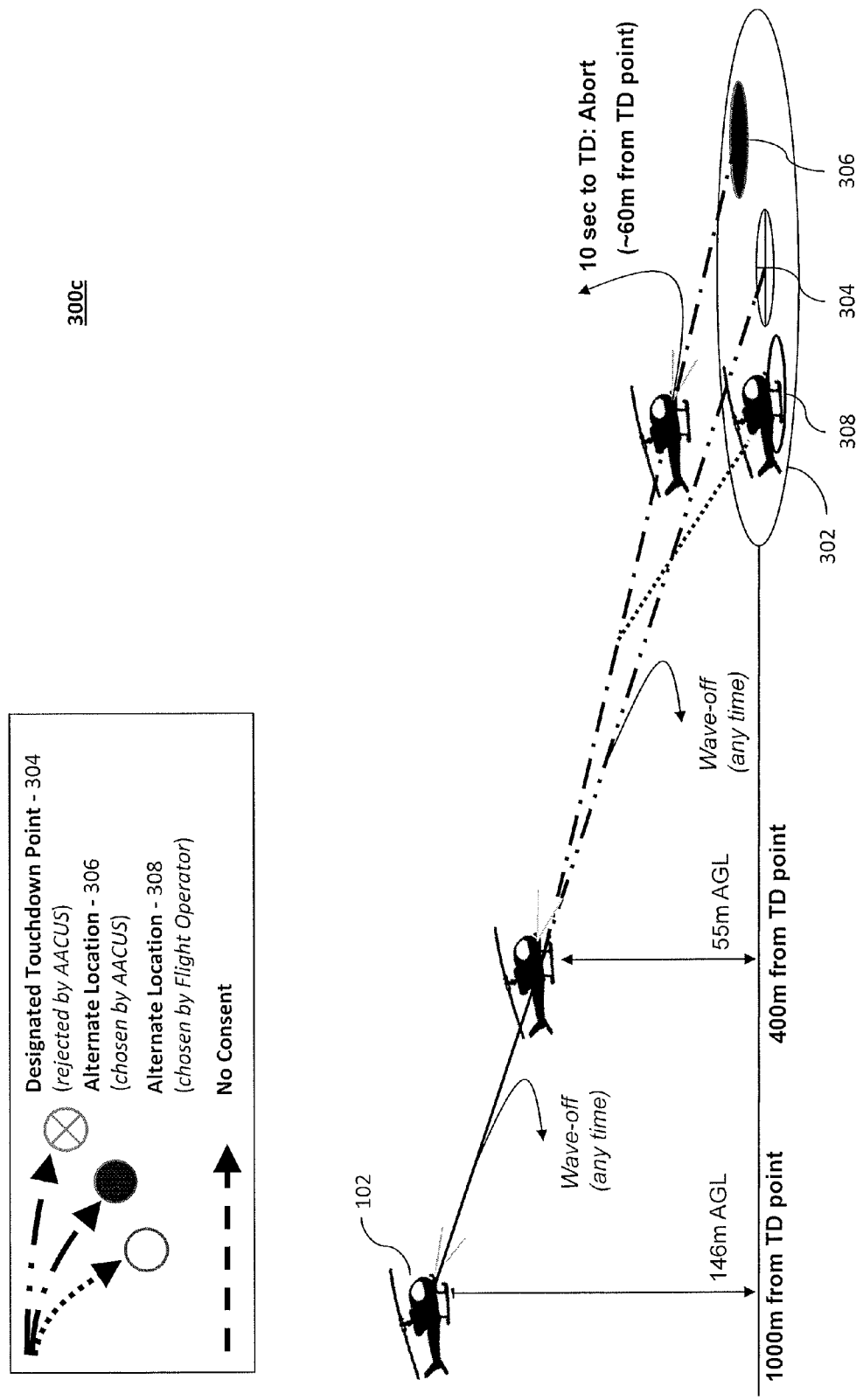

For example, turning now to FIGS. 3a through 3c, when the aerial vehicle 102 is a first predetermined distance from the touchdown zone (e.g., 1 km) and/or a first predetermined time from the touchdown zone (e.g., 55 seconds), the aerial vehicle 102 may begin scanning using the sensor package to detect, for example, terrain features and large obstacles. When the aerial vehicle 102 is a second predetermined distance from the touchdown zone (e.g., 400 m) and/or a second predetermined time from the touchdown zone (e.g., 30 seconds), the aerial vehicle 102 determines whether the designated touchdown zone 304 is feasible. If the AACU system determines that the designated touchdown zone 304 is infeasible, the AACU system may identify one or more alternate touchdown zones 306, which may be communicated to the operator for consideration and/or approval. Throughout this landing procedure, the aerial vehicle 102 may receive, or otherwise detect, a wave-off command.

Between the second predetermined distance/time and a third predetermined distance/time from touchdown 214 (e.g., 60 m, 10 seconds), the AACU system may identify an alternate touchdown zone 306 and inform the operator (or pilot) of the alternate touchdown zone 306. In response the operator may (1) approve the alternate touchdown zone 306; (2) designate a second alternate touchdown zone 308; (3) wave-off the aerial vehicle 102; (4) abort the mission; or (5) do nothing. If the operator does nothing within a predetermined time period (e.g., between 5 and 60 seconds, more preferably 10 seconds and 30 seconds) from touchdown 214, the mission may be aborted. If the operator chooses to abort the mission (explicitly or by failure to act), the aerial vehicle 102 may be directed to a hold-off point 228, or an egress point 310, which will ultimately direct the aerial vehicle 102 to navigate to a predetermined point, such as the initial point 220.

Figure 4:
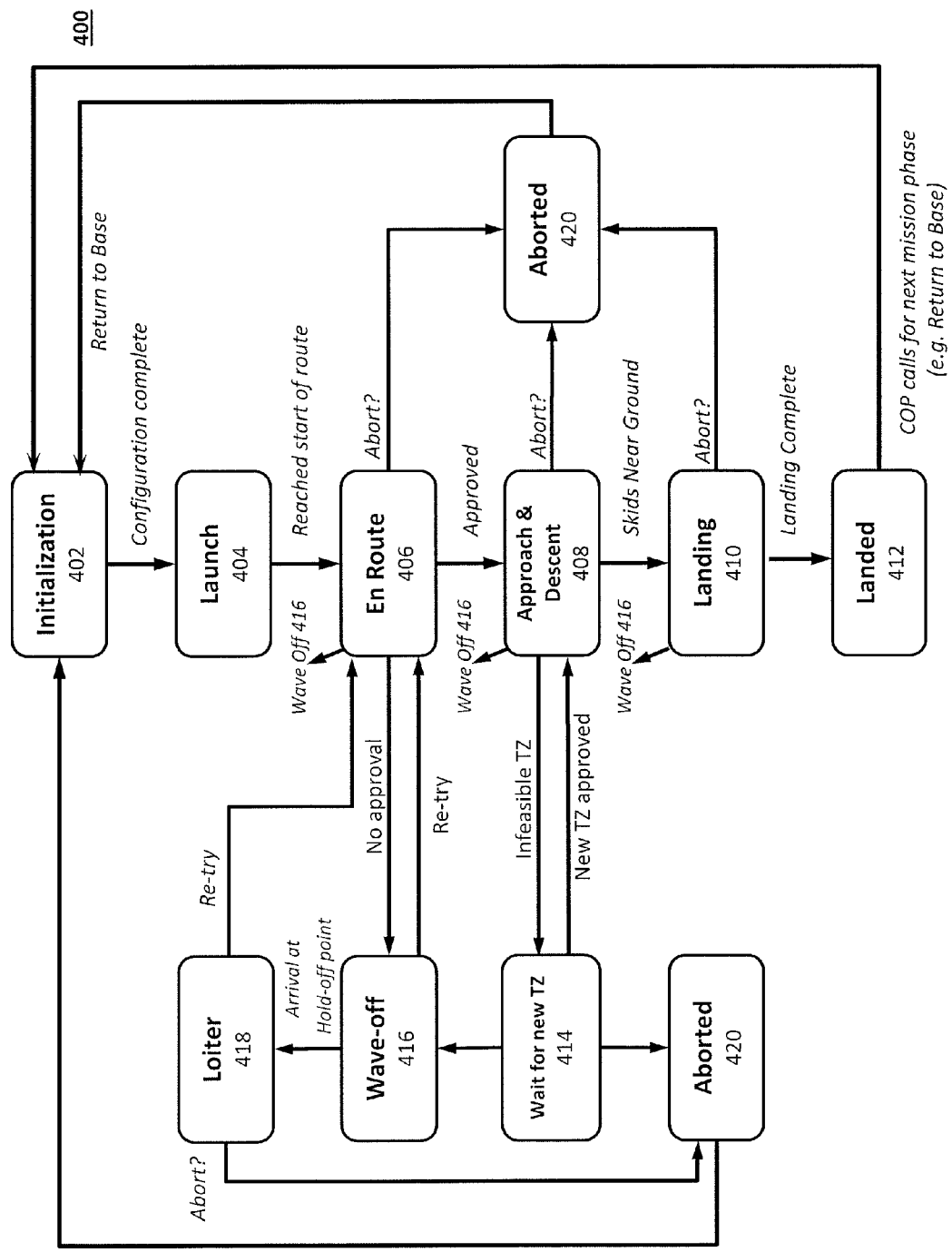
FIG. 4 illustrates an example flow diagram of an example mission for the aerial vehicle of FIG. 1.

FIG. 4 illustrates an example flow diagram of the various mission phases 400. At Step 402, the AACU software initializes and, once complete, will wait for mission data to be uploaded or otherwise received. After the mission data has been communicated to the mission manager, the mission manager may send the mission data to the route and/or trajectory planner. At Step 404, the aerial vehicle 102 may be piloted, or commanded by the main operating base 112, to launch and follow the launch route. At Step 406, the aerial vehicle 102 is en route 206 and, absent further instruction, will autonomously execute the flight route, request landing confirmation at the notification waypoint 222, etc. If landing is approved, the aerial vehicle 102 proceeds to approach and descent at Step 408, where the aerial vehicle 102 executes the descent, relying on the AACU system to identify and land at a touchdown zone as discussed above with regard to approach 208.

If the AACU system determines that the designated touchdown zone 304 is infeasible at 408, the AACU system will identify one or more alternate touchdown zones 306 and await approval at Step 414. At Step 414, an alternate touchdown zone may be provided, directing the aerial vehicle 102 to land at said alternate touchdown zone at Step 410. Alternatively, the aerial vehicle 102 may be waved off, causing the aerial vehicle 102 to proceed to wave-off at 416. In yet another alternative, the mission may be aborted (Step 420), either via a command from the flight controller or a time out, thus causing the aerial vehicle 102 to return to a predetermined location, such as the base. At any of Steps 406, 408 and 410, the aerial vehicle 102 may receive a wave-off command, whereby the aerial vehicle 102 may be directed to a hold-off point 228 (Step 416). The aerial vehicle 102 may then loiter (Step 418) until the mission may be aborted (Step 420) or a retry may be attempted. If the aerial vehicle 102 determines that the designated touchdown zone 304 is feasible at 408, the aerial vehicle 102 proceeds to approach at Step 410, where the aerial vehicle 102 may execute the landing procedure at 410. Once the aerial vehicle 102 is on the ground, the aerial vehicle 102 is deemed to have landed (Step 412). The aerial vehicle 102 may then again initialize (Step 402) for a new mission, or to return to base.

Figure 5:
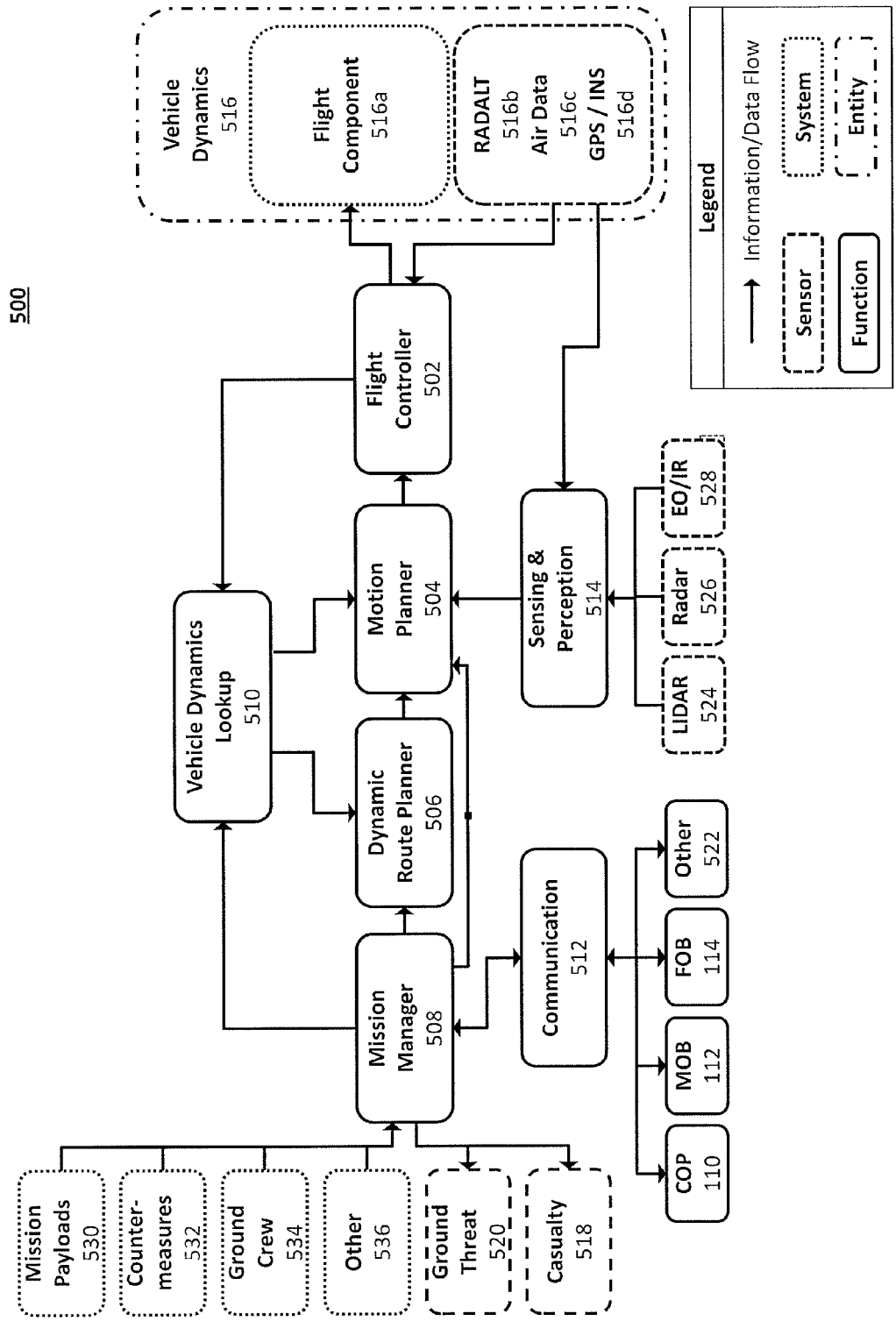
FIG. 5 illustrates a block diagram of an example AACU system architecture.

FIG. 5 illustrates an AACU system's architecture 500, including sensors, mission manager, communications, route and trajectory planning, and flight controls/sensors onboard the vehicles. More specifically, as illustrated, the AACU system's architecture 500 may comprise a flight controller 502, a motion planner 504, a dynamic route planner 506, and a mission manager 508. In use, data may be communicated between two or more of the flight controller 502, the motion planner 504, the dynamic route planner 506, and the mission manager 508 directly, or via the vehicle dynamics lookup module 510. For example, the mission manager 508 may (1) communicate task and constraint data to the dynamic route planner 506; and/or (2) communicate route and task data to the motion planner 504. The dynamic route planner 506 may similarly provide route and task data to the motion planner 504 based on data (e.g., constraints) received from the vehicle dynamics lookup module 510. The motion planner 504 may provide trajectory data to the flight controller based, at least in part, on data received from a sensing and perception system 514 and/or the vehicle dynamics lookup module 510. The vehicle dynamics lookup module 510 may be further configured to receive data (e.g., mission urgency, fuel/cargo weight, etc.) from the mission manager 508.

The flight controller 502 may provide feedback (e.g., vehicle state data, wind estimation data, etc.) to the vehicle dynamics lookup module 510 via the vehicle dynamics module 516, which may generate vehicle dynamic data from one or more sensors (e.g., 516b, 516c, 516d). Such vehicle dynamic data may also be used to control one or more flight controllers or flight controller systems (e.g., flight components 516a). Thus, the flight controller, coupled with the flight components 516a and one or more flight controllers/systems and sensors, may function as the aerial vehicle's flight control system.

The motion planner 504 may be configured to receive data (e.g., obstacle and state data) from the sensing and perception module 514, which may receive data measurements from various sensors, such as Light Detection and Ranging (LIDAR) 524, Radio Detection And Ranging (RADAR) 526, Electro Optical Infrared (EO/IR) Imagers 528, radio altimeter (RADALT) 516b, Air Data Sensor 516c, and/or GPS/Inertial Navigation System (INS) 516d. The mission manager 508 may be communicatively coupled with one or more remotely situated systems or operators via a communications system or module 512. For example, the mission manager 508 may wirelessly communicate with a COP 110, MOB 112, FOB 114, and/or another system 522, such as a medic, ground crew, other vehicles, etc.

The mission manager 508 may be configured to send data reflecting the mission payload 530, countermeasures 532, and/or other data to a ground crew 534 (e.g., a cargo system, auxiliary system, etc.), or another system 536 (e.g., a medical system). Similarly, the mission manager 508 may be configured to receive data from sensors indicating a ground threat 520, or a casualty 518. Any processors and/or other hardware may be powered by a power supply, which may be alternating or direct current (e.g., traditional line current, battery power, solar power, wind power, etc.). The various components of the AACU system's architecture 500, including exemplary features and/or functions, will now be described in greater detail below.

To facilitate the various functionalities of the of the AACU system, the AACU system may employ a processor operatively coupled to (1) a memory/data storage, (2) one or more sensors, and/or (3) other systems disclosed herein or those known in the art. For example, to process and manipulate data, a processor may be equipped to run software that may be stored to ROM, RAM, or one or more other computer-readable storage mediums. Similarly, data collected or created by the AACU system may be stored to RAM, ROM, or another suitable storage medium for longer-term retention. The AACU system may receive and transmit, via said processor, data related to location, speed, etc. The flight controller 502 may further comprise a user interface (e.g., via a HSI device) allowing an operator (e.g., either human or computer-implemented, either of which may be local or remote) to input commands, control operation, and/or adjust settings of AACU system. The user interface may be remotely coupled and/or may include, for example, a computer, a keyboard, mouse, touch screen, joystick, and the like.

Mission Manager 508.

The mission manager may comprise a (1) Mission Sequencer; (2) STANAG to Robot Operating System (ROS) Bridge; (3) ROS to STANAG Bridge; (4) mission plan service; (5) Route Monitor; and (6) Route Feeder.

(1) Mission Sequencer.

The mission sequencer manages the overall behavior of the AACU System and associated air vehicle. It employs multiple state machines, one to manage the overall behavior of the air vehicle and the others to manage the commands issued by the main operating base 112 and combat outpost 110. The mission sequencer may track at which waypoint the aerial vehicle 102 is positioned, instigate communications with the combat outpost 110 for landing negotiation, and tell the route feeder to send a new route to the trajectory planner via the mission command, if needed. The mission sequencer may also communicate to the route feeder which route, or phase of the route, the aerial vehicle 102 is performing (e.g., Initialization and Configuration 202, Launch 204, En Route, 206, Approach 208, etc.).

(2) STANAG to ROS Bridge.

The STANAG to ROS Bridge acts as a bridge between the STANAG 4586 protocol used by the main operating base 112 and the aerial vehicle's vehicle management system, the Dynamic Route Planner (506) (which may or may not communicate using the STANAG-4586 protocol), the ROS protocol used by the mission manager, trajectory planner, perception system 514 and other components of the AACU System. The STANAG to ROS bridge allows integration with the commonly-used STANAG 4586 messaging standard, increasing the portability of the AACU system. This node performs the following services: (1) aggregates a series of STANAG 4586 messages into a single mission plan ROS message and publishes this message over the ROS protocol. The mission plan data may comprise a set of routes (nominally: launch, flight, approach, contingency A, and contingency B), each possibly with their own set of waypoints. The mission plan data for each mission plan may have a source identifier, indicating if the plan came from the main operating base 112 or the Dynamic Route Planner; (2) translates other STANAG 4586 messages into, for example, equivalent ROS messages and publishes those messages over the ROS protocol; and (3) subscribes to select ROS messages and translates them back into STANAG 4586 messages for broadcast on the STANAG 4586 multi-cast network, listened to by the Vehicle Specific Module (VSM) within the VMS, main operating base 112, possibly the Dynamic Route Planner, and possibly the combat outpost 110. While the ROS protocol is disclosed and described herein, it is only one of multiple ways in which messages may be published within the AACU System. Thus, one of ordinary skill in the art would recognize that other protocols, such as DDS, for example, are possible. Accordingly, the AACU system should not be limited to use with the ROS protocol.

(3) ROS to STANAG Bridge.

The ROS to STANAG Bridge performs essentially the opposite function of the STANAG to ROS Bridge; it translates ROS data into STANAG messages and supports the outgoing interface between the AACU system's internal components and the main operating base 112.

(4) Mission Plan Service.

The mission plan service subscribes to the mission plan ROS message, published by the STANAG to ROS node, and stores (in non-volatile memory) and organizes received mission plan data for use by elements of the mission manager, and possibly other ROS nodes. Whenever the mission plan service receives and processes new mission plan data, it may publish a configuration ROS message that specifies that the configuration is complete, and indicates key waypoint identifiers within the mission plan data, currently the rally, notification and approach waypoint identifiers. The mission plan service will ensure that the waypoint identifiers are maintained in ascending numeric order corresponding to the visit order indicated by the route (e.g., if the route indicates the vehicle should visit Rome, Paris and London, in that order, Rome will have a lower numeric waypoint than Paris, which in turn will have a numerically lower waypoint identifier than London). Whenever the mission plan service receives a route data request from another ROS node, it may use the previous route and waypoint identifiers to fetch the corresponding series of waypoints and sends a route data reply with the requested number of waypoints back to the requestor. A request may request the current waypoint the vehicle is heading toward and all subsequent waypoints on the route.

(5) Route Monitor.

The route monitor subscribes to two sensor messages, one from the inertial state reported by the vehicle over STANAG 4586 (translated into a ROS message by the STANAG to ROS node), and the trajectory status message, provided by the trajectory planner using data from the perception system. The route monitor will select or merge information from these two sources and report progress along the route in single floating point value representing a fractional distance from the last past waypoint (e.g., 2.3 means ~30% between waypoint 2 and the next waypoint along the route). This may be the same format as reported by the trajectory planner, although the information may not necessarily come solely from the trajectory planner. This provides the option to generate this signal internally from a mixture of inputs. The route monitor also measures route deviations and will send a Boolean flag embedded along with the route progress within the route status to the mission sequencer.

(6) Route Feeder.

The route feeder block may create the mission command to the trajectory planner based on the current route provided by the mission sequencer, the current vehicle position, provided by the route monitor, and the set of route waypoints provided by the mission plan service. Upon receipt of a route selection from the mission sequencer and a vehicle position from the route monitor, the route feeder requests a set of waypoints (currently from the current vehicle position to the end of the route) from the mission plan service. The mission plan service replies with the requested set of waypoints. The route feeder may then form and publish the waypoints, in the form of a mission command. The trajectory planner may receive these waypoints and adjust its trajectory accordingly.

Dynamic Route Planner 506.

Route planning may be facilitated via a software algorithm called "4D-D*" that explicitly addresses the problem of routing multiple vehicles using a combination of data from maps as well as incrementally discovered information from the onboard sensors. This software is distinct in two specific ways. First, it explicitly considers a 4D space composed of x, y, z, and time, allowing explicit consideration of moving obstacles such as weather or other vehicles that must be avoided. Second, it uses concepts from a well-known route planning algorithm called Field-D* to optimally update trajectories as new information becomes available. This has an advantage that completely new trajectories can be calculated in milliseconds over a large map by modifying the old trajectories versus having to completely re-compute upon receiving new information. Depending on mission urgency or the priority given to saving fuel, different paths might be preferred. The algorithm will choose paths that optimize a large set of criteria, some of which might change during the mission. The algorithm complexity (compute time) may implement an "any time" version that will continually improve the solution given time but will produce an answer (in some cases, suboptimal) at any time it may be requested.

Motion Planner 504.

Given an initial path from the mission planner, the motion planner computes trajectories based on multiple objectives including proximity to obstacles, desired landing vector (based on wind direction), vehicle dynamics, and localization accuracy. The trajectory generation scheme also continuously improves and optimizes trajectories based on the criteria specified. It quickly produces and iterates on a new commanded path that avoids any detected obstacles and that the vehicle can follow. An advantage of this approach may be that the fidelity of the parallel planning algorithm scales with available computing power. If resources are limited, only a small part of the search space can be explored while still obtaining a "good-enough" solution. The planning system is robust and adaptive to the changing dynamics of a cargo aerial vehicle 102 because they will change depending on the weight and wind conditions. The commands may be verified based on propagating the uncertainties of the different objectives and the execution uncertainty in a stochastic optimal control framework. This improves confidence in the execution of a plan and allows high-performance control of the vehicle. Special maneuvers relevant to launch from and landing on sloped terrain may also be employed. The algorithm is configured to account for unexpected discontinuities in vehicle dynamics, e.g., contact with undetected ground features, through the addition of hidden states. Such mission-level and motion planning algorithms may be adapted to a wide range of aerial vehicles. They combine multiple objectives and constraints in real time, incorporate and adapt the dynamics into the motion plan with higher fidelity control, and propagate uncertainties for robust control in sloped landing.

Flight Controller 502.

The flight controller 502 may be operatively coupled with the motion planner 504, the vehicle dynamics lookup module 510, and vehicle dynamics module 516. In operation, the flight controller 502 generates flight control signal data based at least in part on date received from, for example, motion planner 504, and one or more sensors (e.g., RADALT 516$b$, Air Data Sensor 516$c$, and/or GPS/INS device 516$d$). The flight control signal data generated by the flight controller 502 may be communicated to, or used to control, the flight components 516$a$. Example flight components 516$a$ include, for example, rotorcraft flight controls (e.g., a collective, cyclic, pedals, throttle, auxiliary components, etc.) and fixed-wing aircraft controls (e.g., ailerons, rudder, trim tabs, elevators, throttle, etc.).

In one aspect, a flight controller 502 may further employ, for example, a user interface, and a processor operatively coupled to a memory/data storage and the one or more sensors. For example, to process and manipulate data, a processor may be equipped to run software which may be stored to ROM, RAM, or one or more other computer-readable storage mediums. Similarly, data collected or created by the flight controller 502 may be stored to RAM, ROM, or another suitable storage medium for longer-term retention. The flight controller 502 may receive and transmit, via said processor, data related to location, speed, attitude, etc. The flight controller 502 may further comprise a remotely situated user interface allowing an operator (e.g., either human- or computer-implemented, either of which may be local or remote) to input commands and/or control operation of flight controller 502. The remotely situated user interface may be the same remotely situated user interface used to control the AACU system. The user interface may be coupled with the flight controller 502, and may include, for example, a computer, a keyboard, mouse, touch screen, joystick, and the like. To monitor the various flight conditions, the flight controller 502 may further employ one or more sensors (e.g., weather RADAR, engine sensors, vertical/directional gyroscopes, accelerometer, thermometer, altimeters, etc.).

Sensing and Perception 514.

An objective of the foregoing is to enable safe aerial vehicle 102 operations during launch, cruise, and descent by making the aerial vehicle 102 aware of its environment. Thus, an objective of the AACU system may be to ensure a safe final approach and a stable touchdown, and environmental awareness during launch and/or cruise. For example, AACU perception may: (1) support cruise speeds of up to 250 knots; (2) permit a five-mile approach to an LZ in two to four minutes; and (3) be able to operate both in visually degraded and GPS-denied environments. To meet these objectives, a sensor package and perception algorithms are preferably tightly coupled. A sensor package's notable design features may be range (the greater the range of the sensors, the higher the approach speeds that can be supported), range resolution (the finer the resolution, the easier to detect roughness and slope of the terrain), and field of regard (FOR) (a large FOR may be needed to be able to image the landing zone all the way from a distant approach to a view point directly above the landing site). Operation in visually degraded environments will also require sensors that penetrate obscurants, and GPS-denied operation will require employment of available sensors to achieve alternate methods of navigation. Finally, for autonomous aerial vehicles to be accepted by ground forces operating at the forward bases, the aerial vehicle 102 may itself unambiguously identify common human gestures (such as a "wave-off") used by landing support specialists if present at the landing site. Analysis of various military aerial vehicle missions shows that an aggressive low-flying profile such as those typically executed under hostile conditions may be the limiting case for determining the minimal sensor range for collision-free flight. This presumes that the final approach starts at 110 knots (a current example threshold), 600 meters from the landing site. At this speed it may be necessary to sense about 300 meters ahead, presuming that collisions are avoided by a combination of swerving and slowing down. The objective speed of 250 knots may be expected during cruise and may necessitate looking ahead by approximately 1 km. The final parameter, related to the determination of the exact location of the skids on touchdown may be to avoid objects of 15 cm (6") implying that the resolution and accuracy of ranging must be better than five cm. The sensor suite may conduct landing zone (LZ) validation by classifying the terrain around the designated touchdown zone based on shape (rough/smooth, flat/level), as well as by semantics (muddy/dry, vegetated/barren). During cruise flight and during final approach, the sensor suite may be used to find obstacles such as buildings, trees, wires and towers that might not be known ahead of time. Third, the sensor suite may be used to estimate vehicle position in the case of GPS denial or outage that could occur due to jamming or due to blockage by terrain. A point of departure design includes redundant, complementary sensors.

Scanning LIDAR 524.

LIDAR, also called a laser scanner, refers to a technology capable of measuring distance by illuminating a target with a laser and analyzing the reflected light. Thus, a two-axis scanning LIDAR may be used to provide high-resolution imaging starting at 400 meters so as to enable "straight-in landings" at speeds up to, for example, 135 knots. With a very large field of regard (180°), the Scanning LIDAR may be used as a primary sensor for environmental perception, whereby the laser ranging is capable penetrates all but heavy obscurants. The same LIDAR may be used for gesture recognition of personnel indicating final approval to land or a wave-off. Small LIDARs, positioned appropriately, may also be used to determine if the aerial vehicle 102 is sinking in vegetation or soft terrain, and to avoid tail strikes during launches involving pedal turns.

RADAR 526.

RADAR, such as a forward-looking RADAR, may be used to provide low-resolution imaging through weather conditions and thick brownout conditions during landing. The forward-looking RADAR may be configured to measure distance to objects, such as transmission towers, tree lines, and other vehicles, at distances of up to 2 km. In addition, this modality can be used to perform "cruise-missile"-like navigation in GPS-denied environments.

EO/IR Imagers 528.

Passive Electro Optical Infrared (EO/IR) Imagers may be generally used for navigation in GPS-denied environments, for terrain analysis and detection of water and vegetation.

Communication 512.

The AACU system architecture 500 may be operatively coupled with one or more communication transceivers, which may be used to wirelessly communicate data signals between the aerial vehicle 102 and a remote system, such as a COP 110, MOB 112, FOB 114, and/or another system 522. For example, a wireless communication device may be configured to communicate data (e.g., Surveillance Data, mission plan data, and/or flight control signal data) with the one or more remote systems. To facilitate optional wireless communication, the aerial vehicle 102 may further comprise an air communication link enabled to transmit ("TX") and receive ("RX") data using one or more antennas (e.g., top and bottom). The antenna may be controlled via a processor that is operatively coupled to an RF switch. Thus, data collected or created by the AACU system's architecture 500 may be communicated with a remote system and/or any other device capable of wired or wireless communication using either a wired communication link or a wireless communication link.

Lost Communications.

The AACU system may provide, for example, three or more communications links, such as (1) MOB 112 to aerial vehicle 102, (2) COP 110 to aerial vehicle 102, (3) FOB 114 to aerial vehicle 102, and (4) between one or more of the MOB 112, COP 110, and/or FOB 114. Communications may be maintained by establishing any two communications links. For example, an aerial vehicle 102 equipped with an AACU system may execute a lost communications contingency if communications are lost with both the main operating base 112 and the combat outpost 110. If communications with either are present, the AACU system-equipped aerial vehicle 102 may continue its mission, except for situations where specific communications are required (e.g., requiring landing confirmation from the combat outpost 110). In such cases, the AACU system-equipped aerial vehicle behavior may be explicitly specified for that scenario. Lost communications with the main operating base 112 may be defined according to the STANAG standard. Lost communications with the combat outpost 110 may be defined as the lack of a heartbeat message for a predetermined time (e.g., 10 to 300 seconds, more preferably 20 seconds to 100 seconds, most preferably about 30 seconds). If communication is re-established after a lost communications contingency has been executed, the operator may override the AACU system-equipped aerial vehicle's behavior by uploading and executing new mission plan data. This may include commanding the aerial vehicle 102 to execute its currently loaded mission. The main operating base 112 has the capability of uploading new mission plan data, whereas the combat outpost 110 does not. Therefore, the only function a combat outpost 110 can execute is to command the AACU system-equipped aerial vehicle 102 to re-establish its mission to land at the previously-designated touchdown zone (or alternate thereto).

GPS/INS 516*d*.

When available, a GPS/INS device 516*d* may be used to provide latitude and longitude information, as well as altitude. GPS/INS device 516*d* uses GPS satellite signals to correct or calibrate a solution from an INS. The GPS gives an absolute drift-free position value that can be used to reset the INS solution, or can be blended with the INS by use of a mathematical algorithm, such as a Kalman Filter. The angular orientation of the unit can be inferred from the series of position updates from the GPS. The change in the error in position relative to the GPS can be used to estimate the unknown angle error. The benefits of using GPS with an INS are that the INS may be calibrated by the GPS signals and that the INS can provide position and angle updates at a quicker rate than GPS. For high dynamic vehicles, such as missiles and aerial vehicles, INS fills in the gaps between GPS positions. Additionally, GPS may lose its signal and the INS can continue to compute the position and angle during the period of lost GPS signal.

When the GPS/INS device 516*d* is unavailable (e.g., a GPS-Denied Operation), which may be due to poor reception or a malfunction, the AACU system's architecture 500 remains functional where GPS signals are interrupted; for example, due to active jamming or shadowing from terrain. Generally speaking, the AACU system may navigate the aerial vehicle 102 using visual landmarks for navigation during descent. Specifically, satellite maps of the area along with Digital Terrain Evaluation Data (DTED) may be used to determine salient features offline. Thus, one or more databases, which may be stored to a memory/data storage device, may be used to store information related to, without limitation, DIED, buildings and structures, geographical maps, military maps, and/or any other information that may be used to assist in navigating the aerial vehicle. During a mission, features from an onboard camera are compared to the maps to produce a navigation solution. Typically, accuracy may be 1% of distance traveled for such applications. In the case that salient features are continuously available during the mission, drift in navigation can be significantly reduced. Flight tests show that navigation error can be capped to 10 meters (3 sigma) in an hour of flight over varying terrain.

Obscurant Penetration and Obstacle Detection During En Route Cruise.

Visually degraded environments are common in combat operations and can complicate the process of autonomous low-elevation flight. Ensuring collision-free flight when flying close to and inside clouds or during the final approach where the landing zone may be obscured by brownout may require special consideration. An approach to this may be two-fold. First the LIDAR may be capable of ranging in light through moderate obscurants using a method called full waveform analysis. In contrast to most laser-ranging devices that use the first return over threshold to compute range, this method looks at all returns from a laser "chirp" to determine the furthest opaque object. Intermediate returns can automatically be flagged in the sensor hardware. Since laser ranging cannot penetrate the thickest obscurants and because high cruise speeds may require km-scale ranging, a RADAR (e.g., W-Band (94 GHz)) may be included for operating the aerial vehicles 102 in a brownout environment. At cruise speeds, the RADAR look-ahead distance for objects such as transmission towers and ridgelines may be increased (relevant in case of navigation failure). During final approach, the RADAR can provide returns corresponding to ground objects such as vehicles, buildings and power lines. RADAR returns from a ALG W-band (94 Ghz) RADAR mounted to the front of an aerial vehicle 102 descending into a landing zone may be mapped onto a pilot's display during an approach to a landing zone.

Gesture Recognition for Communication with Landing Support Specialists.

The LIDAR for landing zone validation can be used to detect gestures by field personnel. Simple gestures can be detected by the LIDAR used to perform landing zone validation and to generate a range image. Such imagery is robust to ambient illumination or requiring the personnel to use any fixed infrastructure to signal to the aerial vehicle. Hand and/or body gestures already in use by marine landing support specialists and army pathfinders can likely be used to provide final confirmation to land or to wave-off the landing.

The perception system offers at least three advantages, including: (1) Combining scanning LIDAR and RADAR provides both long-range detection in degraded visual environments ("DVE") and high resolution for determining an optimal landing zone; (2) position estimation that can be based on EO/IR Imagers/LIDAR/RADAR as necessary (only EO/IR Imagers might be used for stealth) to provide robustness (e.g., to GPS outage) and high performance; and (3) Terrain Analysis based on both geometry (from LIDAR) and vegetation properties (EO/IR Imagers). The main sensor (scanning LIDAR) is a derivative of a commonly used device for aerial survey and offers significantly higher accuracy, larger adaptable field of view, and lower price than other sensors such as Flash LIDAR. The RADAR sensor may be configured to penetrate weather and brownout conditions to provide assurance of collision-free flight.

Internal Interfaces.

The Configuration sent from the mission plan service to the mission sequencer indicates whether or not the configuration is complete, and contains the indices of specific action waypoints: (1) rally waypoint 218—last waypoint of launch route—used to change from launch to flight route; (2) notification waypoint 222—point at which AACU system requests permission to land from the combat outpost 110; and (3) approach waypoint—last waypoint of flight route and first waypoint of approach route. The configuration also contains status regarding an updated mission and threshold for route deviation, beyond which a route re-plan may be necessary.

Route Data Request.

A Route Data Request is one half of a synchronous ROS service call to the mission plan service to request a set of waypoints along a given route. The request contains the route identifier, the starting waypoint identifier to fetch from, and the number of consecutive waypoints to fetch or a flag valve to fetch all remaining waypoints in the route. Upon receipt of this request, the mission plan service will reply with an array of waypoints.

Waypoints.

This ROS message is the response to a route data request. It comprises an array of waypoints, starting from the waypoint identifier indicated in the request and containing the number of waypoints requested. If the request indicates all remaining waypoints, this response will contain all remaining waypoints along the route.

Route Status.

The route status message indicates the current location of the vehicle relative to the route's waypoints and a Boolean flag indicating if the vehicle has veered too far off the planned route. The vehicle's waypoint location may be expressed as a floating-point waypoint identifier, where the integer portion indicates the most recent waypoint passed, and the fractional portion indicates the fractional distance between the passed waypoint and the next waypoint the vehicle is flying toward (this may be an identical representation to the Trajectory Status). The Boolean flag indicates if the vehicle flight path has diverged past some limit from the planned path and may trigger a re-plan, if so determined by the Mission Sequencer.

Human-System Interface (HSI).

An objective is to generally have an autonomous aerial vehicle fit into the cargo delivery and casualty evacuation process as seamlessly as possible. The AACU system's value stems not only from technical achievement but also from its procedures being easily adopted by personnel interacting with the vehicle at various stages of the mission with no specialized training. Landing at unprepared sites historically required specific attention since units operating in remote locations are severely resource-constrained. Interaction with the vehicle must be achievable with minimal equipment and infrastructure. Hence, field personnel may be able to request services from an aerial vehicle equipped with an AACU system for cargo resupply and CASEVAC. This interface must be intuitive and oriented around the tasks done during cargo and casualty evacuation using an intuitive interface. In some cases, it may be essential that the vehicle not depend on an operator to land since it might be directed to a location with no ground personnel or communication. Hence the most useful role of the operator during the critical landing phase may be to enhance safety, allowing the complete human-machine system to perform at a higher level of capability than the machine or a human pilot on his or her own. Human-system interaction will also enable a level of redundancy in case the onboard systems fail or their performance may be degraded.

Interface technologies may be tailored according to how useful they are to the MOB 112, FOB 114, and COP 110 operators. For example, at the MOB 112, this might lead to networked PCs with smart boards. At the slightly more austere FOB 114, the UGCS-400 interface with touch screens for simple negotiation offers potential. At the very austere COP 110, size, weight, and power are particularly constraining, and we will consider cell phone applications and functionality. More sophisticated functionality, such as multi-vehicle tasking at the FOB 114 or complex negotiations with both the FOB and vehicle at the COP 110 may be possible.

Modular and Open System Architecture.

AACU system emphasizes modular, platform-agnostic processors, sensor suites and software that can be adapted to various aerial vehicles and missions, thus lowering total ownership costs and the time needed to integrate developed technology into fielded systems. Current solutions for complex architectures rely on a series of point-to-point devices, each with specialized interfaces. To lower the number of components in these systems, many functions are usually combined within one device using tightly coupled code developed for specific hardware, operating systems, applications, and target platforms. Traditional architectures require significant time and capital resources to integrate, certify, and upgrade while limiting life-cycle maintenance to one prime integrator. An AACU system, however, would benefit from an improved architecture that allows functional modules to be interoperable with clearly defined interfaces. In addition, the architecture will need to support health monitoring, diagnostics, and restarting of failed computer processes during the mission, all without the involvement of an onboard crew.

AACU system functional architecture with innovative approaches to perception, planning, and HSI may be integrated within a robust open architecture framework to provide platform-agnostic automation for rapid resupply and CASEVAC. To open the development ecosystem, an Open Architecture and/or Global Open Architecture Layer (GOAL) may be employed to exploit concepts of module partitioning, hardware and software abstraction, loose coupling of functional modules, and a central standardized data exchange layer. The GOAL, for example, may be implemented as a Service-Oriented Architecture (SOA) that exchanges data through a shared canonical data model using the Data Distribution Service (DDS) international standard. Platform/mission-specific modules are easily replaced in such architectures. DDS may be an anonymous publication/subscription middleware standard that provides a low overhead and low latency solution targeted for real-time processing and embedded applications. DDS allows for extensive control of quality of service attributes that ensure reliability, bandwidth, delivery deadlines, resource limits, priorities, security, and information assurance. Combined with hardware and operating system abstraction, this architecture facilitates component re-use, services 'plug and play', open competition for development and integration, platform-agnostic functionality, and interoperability between system components and other systems. The architecture also allows other advances like system health monitoring and sense and avoid to be easily integrated into the overall AACU system-equipped aerial vehicles. GOAL enables universal AACU services to control 'plug and play' platforms, sensors, and equipment via a government controlled interface standards.

Figure 6:
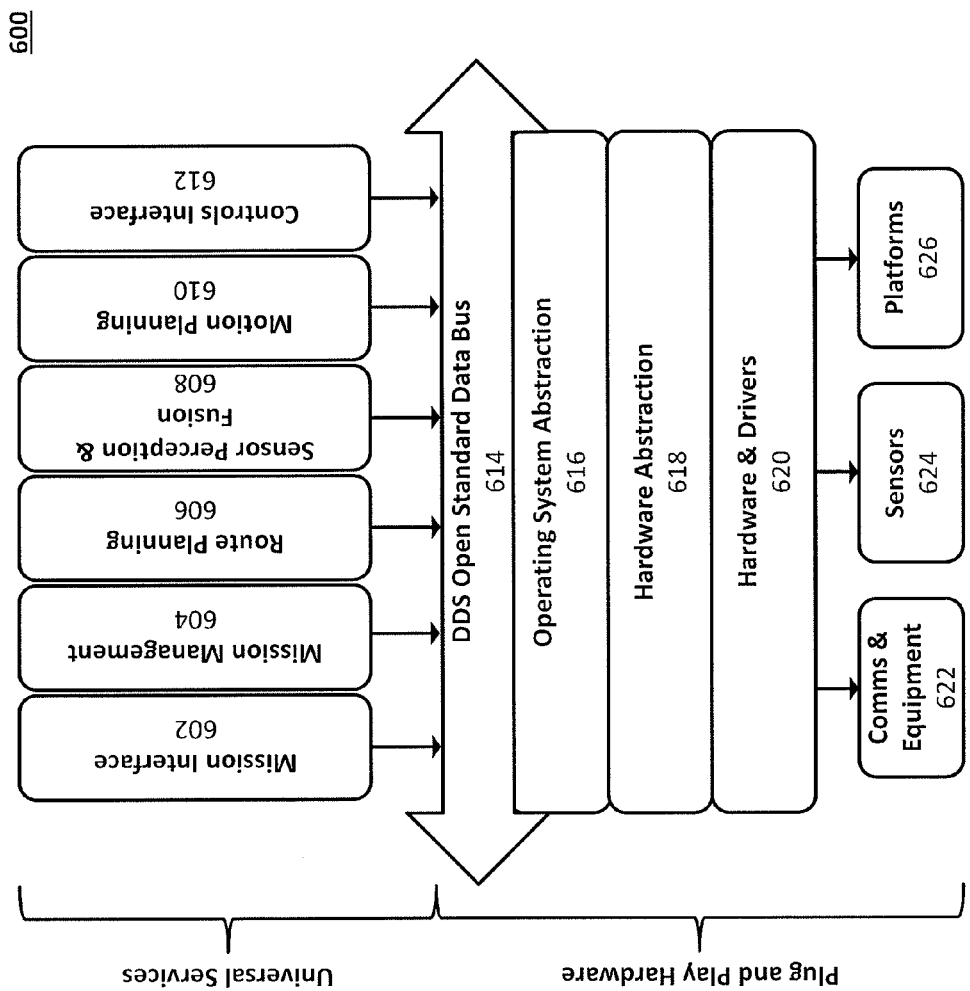
FIG. 6 shows a high-level view of a proposed system architecture as composed of functional modules.

FIG. 6 illustrates a high-level view of the proposed architecture as comprised of functional modules, each of which enforces a well-defined interface. The top layer may include a number of universal services, such as mission interface 602, mission management 604, route planning 606, sensor perception and fusion 608, motion planning 610, and controls interface 612. One or more of the universal services may be communicatively coupled with DDS open standard data bus 614. Operatively coupled to the DDS open standard data bus 614 are one or more plug and play hardware component layers. For example, operating system abstraction 616 may be provided and designed to abstract the operating environment to at least one targeted operating system. The operating system abstraction 616 may implement the operating system application programming interface (API) for a particular underlying operating system and hardware platform. Thus, the abstraction layer provides a direct implementation for functionality that an underlying operating system may not support. Example abstraction layers may include, for example, a hardware abstraction layer 618, a hardware and drivers abstraction layer 620, which may operative couple hardware such as communication and equipment 622, sensors 624, and platforms 626

System Architecture.

The AACU system may be composed of a set of top-level subsystems. These are: ground units (e.g., forward operating base 114, main operating base 112 and combat outpost 110) and airborne units (e.g., VMS/VSM, mission manager, trajectory planner, perception system, and flight control system). The main operating base 112 and the combat outpost 110 are the ground control units, the main operating base 112 being a full-blown ground control system and the combat outpost 110 being a small, hand-held device for use in the field. The airborne units comprise the majority of the AACU system, with the exception of the VMS and flight control system, which are part of the aerial vehicle.

Mission Manager Architecture.

The mission manager is generally responsible for coordinating the major autonomous operations of the vehicle, including: (a) sequencing the major autonomous operations of the vehicle, such as notifications to the command outpost, receipt and processing of wave-off and aborts, etc.; (b) monitoring and feeding desired location information (waypoints) to a trajectory planner; (c) requesting the automatic recalculation of the flight route upon significant deviations from the desired flight route or upon changes in the mission's area of operation (safe air volume); (d) the portability and openness of the invention may be ensured through: (i) open communications standard (e.g., user datagram protocol (UDP)); and (ii) separation of logic from the messaging format in order to facilitate future migration to a global open architecture; (e) ease-of-use may be: (i) ensured through support of IP-based radio communications with the AACU system-equipped aerial vehicle; (ii) developed using Human-Machine Interface (HMI) methods inherent in modern mobile device applications such as Apple's iOS or Google's Android; and (iii) controlled from a mobile, man-packable device that capitalizes on modern communications technology.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. An autonomous aerial system comprising:
    an aerial vehicle configured to communicate with an operating base over a wireless link, wherein said aerial vehicle is configured to receive, from said operating base, mission plan data having one or more routes and a designated touchdown zone within a landing zone; and
    an onboard supervisory control system operatively coupled with the aerial vehicle, the onboard supervisory control system having a processor operatively coupled with a non-volatile memory device and a sensor package,
        wherein the processor is configured to generate flight control signal data based at least in part on data received via the sensor package, the sensor package configured to, in real time, (1) detect obstacles along a flight route, and (2) perceive physical characteristics of the landing zone, and
    wherein the processor is configured to (1) autonomously navigate the aerial vehicle to the designated touchdown zone, and (2) determine whether it is feasible to touchdown at the designated touchdown zone based at least in part on (a) said mission plan data, and (b) physical characteristics of the designated touchdown zone perceived via said sensor package.

2. The autonomous aerial system of claim 1, wherein said mission plan data further comprises a first contingency operation and a second contingency operation.

3. The autonomous aerial system of claim 1, wherein said one or more routes comprises (1) a launch route, (2) an approach route, and (3) a flight route.

4. The autonomous aerial system of claim 1, wherein said processor is further configured to identify one or more alternate touchdown zones within said landing zone if said processor determines that the designated touchdown zone is not feasible, wherein the processor identifies the one or more alternate touchdown zones in real time based on physical characteristic of the landing zone perceived via said sensor package.

5. The autonomous aerial system of claim 4, wherein said one or more alternate touchdown zones are communicated to a human operator at the operating base for approval via a user interface.

6. The autonomous aerial system of claim 1, wherein the sensor package includes (1) a radio altimeter, (2) an electro optical or infrared imager, and (3) a light detection and ranging device.

7. The autonomous aerial system of claim 1, wherein the sensor package includes (1) a radio detection and ranging device and (2) a global positioning system device.

8. The autonomous aerial system of claim 1, wherein the onboard supervisory control system is operatively coupled with the aerial vehicle via a Global Open Architecture Layer.

9. The autonomous aerial system of claim 1, wherein said mission plan data comprises at least one route in accordance with North Atlantic Treaty Organization Standardization Agreement 4586.

10. The autonomous aerial system of claim 1, wherein said aerial vehicle is a vertical take-off and landing aerial vehicle.

11. The autonomous aerial system of claim 1, wherein the onboard supervisory control system is a modular open architecture sensor suite that is physically mounted on the aerial vehicle.

12. The autonomous aerial system of claim 2, wherein said first contingency operation is a lost communications contingency.

13. The autonomous aerial system of claim 12, wherein said second contingency operation is an alternate touchdown zone within said landing zone.

14. A supervisory control system for controlling an aerial vehicle, the supervisory control system comprising:
    a sensor package configured to, in real time, (1) detect obstacles along a flight route, and (2) perceive physical characteristics of a landing zone; and
    a processor operatively coupled with an aerial vehicle via a control interface,
        wherein said processor communicates mission plan data from an operating base to said aerial vehicle via the control interface, the mission plan data having one or more routes and a designated touchdown zone within the landing zone,
        wherein the processor generates flight control signal data based at least in part on data collected via the sensor package,
        wherein the processor is configured to communicate the flight control signal data to the aerial vehicle via the control interface, and
        wherein said processor enables said aerial vehicle to (1) autonomously navigate to the designated touchdown zone, (2) determine whether it is feasible to touchdown at the designated touchdown zone based at least in part on (a) said mission plan data, and (b) physical characteristics of the designated touchdown zone perceived via said sensor package, and (3) if said processor determines that the designated touchdown zone is not feasible, identify one or more alternate touchdown zones within said landing zone, the processor to identify the one or more alternate touchdown zones in real time based on physical characteristics of the landing zone perceived via said sensor package.

15. The supervisory control system of claim 14, wherein the control interface employs a Global Open Architecture Layer.

16. The supervisory control system of claim 14, wherein the supervisory control system is a modular open architecture processor and sensor suite that is physically mounted on the aerial vehicle.

17. The autonomous aerial system of claim 1, wherein the operating base includes a user interface to receive an instruction from a human operator.

18. The autonomous aerial system of claim 17, said instruction to control an operating parameter of the aerial vehicle over the wireless link.

19. The supervisory control system of claim 14, wherein the sensor package includes (1) a radio altimeter, (2) an electro optical or infrared imager, and (3) a light detection and ranging device.

20. A vertical take-off and landing (VTOL) aerial vehicle comprising:
   a wireless transceiver to provide two-way communication with an operating base over a wireless link, wherein said VTOL aerial vehicle is configured to receive from said operating base mission plan data having one or more routes and a designated touchdown zone within a landing zone; and
   a supervisory control system having a processor to generate flight control signal data based at least in part on data received via a sensor package,
      wherein the sensor package is configured to, in real time, detect obstacles along a flight route and perceive physical characteristics of the landing zone, the sensor package including at least one of (1) a radio altimeter, (2) an electro optical or infrared imager, and (3) a light detection and ranging device; and
      wherein the processor is configured (1) to autonomously navigate the VTOL aerial vehicle to the designated touchdown zone, (2) determine whether it is feasible to touchdown the VTOL aerial vehicle at the designated touchdown zone based at least in part on (a) said mission plan data, and (b) physical characteristics of the designated touchdown zone perceived via said sensor package; and (3) if said processor determines that the designated touchdown zone is not feasible, identify one or more alternate touchdown zones within said landing zone based on physical characteristic of the landing zone perceived in real time via said sensor package.

21. The VTOL aerial vehicle of claim 20, wherein the supervisory control system is a modular platform-agnostic open architecture sensor suite that is physically mounted on the VTOL aerial vehicle.

22. The VTOL aerial vehicle of claim 20, wherein the operating base includes a user interface to receive an instruction from a human operator, said instruction to control an operating parameter of the aerial vehicle over the wireless link.

23. The VTOL aerial vehicle of claim 22, wherein said instruction overrides the flight control signal data, or portion thereof, generated by the processor.

* * * * *

(12) INTER PARTES REVIEW CERTIFICATE (2015th)
United States Patent                (10) Number:     US 9,557,742 K1
Paduano et al.                       (45) Certificate Issued:   Apr. 15, 2021

(54) AUTONOMOUS CARGO DELIVERY SYSTEM

(71) Applicants: James D. Paduano; John B. Wissler; Michael D. Piedmonte; David A. Mindell

(72) Inventors: James D. Paduano; John B. Wissler; Michael D. Piedmonte; David A. Mindell

(73) Assignee: AURORA FLIGHT SCIENCES CORPORATION

Trial Number:

IPR2018-01704 filed Sep. 11, 2018

Inter Partes Review Certificate for:

Patent No.: 9,557,742
Issued:     Jan. 31, 2017
Appl. No.:  14/554,852
Filed:      Nov. 26, 2014

The results of IPR2018-01704 are reflected in this inter partes review certificate under 35 U.S.C. 318(b).

INTER PARTES REVIEW CERTIFICATE
U.S. Patent 9,557,742 K1
Trial No. IPR2018-01704
Certificate Issued Apr. 15, 2021

AS A RESULT OF THE INTER PARTES REVIEW PROCEEDING, IT HAS BEEN DETERMINED THAT:

Claims 1-4, 6-16 and 19-21 are disclaimed.

\* \* \* \* \*